(12) United States Patent
Saarela et al.

(10) Patent No.: US 6,301,475 B1
(45) Date of Patent: Oct. 9, 2001

(54) PROCEDURE FOR LIMITING THE MOBILITY AREA OF A TERMINAL DEVICE IN A WIRELESS LOCAL LOOP

(75) Inventors: Petri Saarela, Tupos; Jussi Sarpola, Oulu, both of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/237,419

(22) Filed: Jan. 26, 1999

Related U.S. Application Data

(63) Continuation of application No. PCT/FI97/00467, filed on Aug. 6, 1997.

(30) Foreign Application Priority Data

Aug. 14, 1996 (FI) .................................................. 963191

(51) Int. Cl.[7] ................................................ H04Q 7/20
(52) U.S. Cl. ............................ 455/426; 455/422; 455/435
(58) Field of Search .................................. 455/435, 422, 455/439, 440, 444, 456, 426

(56) References Cited

U.S. PATENT DOCUMENTS

| | | | |
|---|---|---|---|
| 5,430,790 | * 7/1995 | Williams | 455/33.1 |
| 5,561,836 | * 10/1996 | Sowles et al. | 455/12.1 |
| 5,825,759 | * 10/1998 | Liu | 455/33.1 |
| 5,920,818 | * 7/1999 | Frodigh et al. | 455/443 |
| 6,185,412 | * 2/2001 | Pentikainen et al. | 455/404 |

FOREIGN PATENT DOCUMENTS

| | | | |
|---|---|---|---|
| 0505106A | * 3/1992 | (EP) | H04Q/7/03 |
| 0 505 106 | 9/1992 | (EP) . | |
| 0 641 137 | 3/1995 | (EP) . | |
| WO 96/34500 | * 4/1995 | (WO) | H04Q/7/20 |
| WO 97/03531 | * 7/1995 | (WO) | H04Q/7/22 |
| WO 96/34500 | 10/1996 | (WO) . | |
| WO 97/03531 | 1/1997 | (WO) . | |

* cited by examiner

Primary Examiner—William G. Trost
Assistant Examiner—Tilahun Gesesse
(74) Attorney, Agent, or Firm—Altera Law Group, LLC

(57) ABSTRACT

The present invention relates to a wireless local loop. In particular, the present invention relates to a procedure for limiting the mobility area of a terminal device in a wireless local loop environment. According to the invention, the mobility area (MOA) for the terminal device (5) is defined as a specified geographic area comprising the coverage area of at least one cell (4), and the locking of the terminal device with the local loop and/or channel change by the terminal device is inhibited if the cell from which the terminal device is trying to get locked or to whose channel it is trying to change is outside the mobility area.

13 Claims, 3 Drawing Sheets

PROCEDURE FOR LIMITING THE MOBILITY AREA OF A TERMINAL DEVICE IN A WIRELESS LOCAL LOOP

"This application is a continuation of international application number PCT/FI97/00467, filed Aug. 6, 1997, pending."

BACKGROUND OF THE INVENTION

1. Field of the Invention

The present invention relates to a wireless local loop. In particular, the present invention relates to a procedure for limiting the mobility or usability of a terminal device in a wireless local loop environment, as defined in the preamble of claim 1.

2. Description of Related Art

In a wireless local loop (WLL), a terminal device is connected via a radio link to an access node. Between the terminal device and the access node there is a base station, by means of which the call signals received via radiocommunication from the terminal device are further transmitted through the access node to the public telephone network and vice versa. The access node is connected to the telephone exchange using the V5.2 protocol. The mobility area (MOA) of a terminal device is a geographic area within which the terminal device may be connected to a wireless local loop and outside which the terminal device cannot be connected to the local loop. The mobility area defines the mobility area of a terminal device within the wireless network comprised by an access node. Mobility of a terminal device between the access nodes of a WLL operator is inhibited because subscriber information is only defined in a single access node. A terminal device cannot be locked with a public GSM network because the WLL operator has its own network identifier and no roaming agreement with GSM operators.

Open interfaces (V5.1 and V5.2) between an access node and a telephone exchange are defined in the ETSI (European Telecommunications and Standards Institute) standards of the ETS 300 324 and ETS 300 347 series. V5 interfaces enable subscribers belonging to a physically separate local loop to be connected using the standard interface of a telephone exchange. A dynamic concentrator interface V5.2 consistent with the standards ETS 300 347-1 and 347-2 consists of one or more (1–16) PCM (Pulse Code Modulation) cables. One PCM cable comprises a total of 32 channels, each of which with a transfer rate of 64 kbit/s, i.e. 2048 kbit/s in all. The V5.2 interface supports analogue telephones as used in the public telephone network, digital subscriptions, such as ISDN (Integrated Services Digital Network) basic and system subscriptions as well as other analogue or digital terminal equipment based on semi-fixed connections.

There are prior-art wireless telephone networks, an example of which is the digital GSM mobile telephone network, in which voice or sound signals or other corresponding data are transmitted using systems based on the ISDN (Integrated Services Digital Network) technology. In the GSM mobile telephone system, a terminal device may work in the entire area of the network, i.e. the terminal device may get locked, perform channel changes and other actions in the area of any cell. However, in a wireless local loop environment, a desired feature is the ability to accurately determine, e.g. via actions by the network operator, the area in which a mobile terminal device connected to the system via a wireless link can be used. A problem with prior-art networks is that the mobility area cannot be delimited. A further problem is that current systems provide no means for delimiting the mobility area for each individual terminal device.

SUMMARY OF THE INVENTION

The object of the present invention is to eliminate the problems described above. A specific object of the present invention is to present a wireless local loop system in which a new radio network level has been defined. A further object of the present invention is to produce a procedure for controlling a wireless local loop in a way that allows the mobility area for each terminal device to be accurately defined.

In the procedure of the present invention for limiting the mobility area of a terminal device in a wireless local loop environment, which comprises an access node connected to a telephone exchange and a base station having a coverage area comprising one or more cells and used to transmit call signals between the access node and the terminal device, according to the invention, the mobility area for the terminal device is defined as a specified geographic area comprising the coverage area of at least one cell and, further according to the invention, locking with the local loop and/or channel change by the terminal device is inhibited if the cell with which the terminal device is attempting to get locked/to whose channel it is trying to change is outside the mobility area. The cell to whose channel the terminal device is trying to change is called the target cell. The connection between the access node and the telephone exchange, which is an access node V5 interface consistent with the V5 standard, is preferably implemented using signalling consistent with the V5 standard.

Further, in a preferred embodiment, at the wireless network level, a specified geographic area is defined as the location area (LA), which corresponds to the coverage area of one cell, and the location area is assigned an individual identification code. Thus, since the location area always contains only one cell, accurate information is obtained as to the cell from which the terminal device is trying to get locked with the network or the cells from/to which it is trying to change channels. Further, the mobility area preferably comprises one or more location areas. Therefore, the mobility area is a new wireless network level, consisting of location areas.

In conjunction with the definition of the mobility area, data identifying the location areas comprised in the mobility area are stored in a register corresponding to the terminal device. In this way, the operator can create for each terminal device belonging to the system a unique mobility area which is independent of other terminal devices or their mobility areas.

Further, in a preferred embodiment of the present invention, when a terminal device is being initialized, the cell data for the location area of the terminal device are compared with the cell data stored in the register corresponding to the terminal device and, if the cell data for the location area are inconsistent with the cell data stored in the register corresponding to the terminal device, the initialization of the terminal device is terminated and the cell data for the location area are stored in an inhibition cell register in the terminal device. In this context, initialization refers to the initial actions performed by the terminal device at switch-on to establish connection with the base station and determine the parameters needed for the connection. Correspondingly, when the terminal device is initializing a channel change, the cell data for the target cell to which a channel change is being attempted are compared with the cell data in the register corresponding to the terminal device and, if the cell data for the target cell are inconsistent with the cell data in the register corresponding to the terminal device, the channel change to the target cell, initialized by the terminal device, is inhibited and the cell data for the target cell are stored in an inhibition cell register in the terminal device. Storing the cell data for the inhibition cells in an inhibition cell register in the terminal device has a significant effect towards reducing the number of initialization and channel change signals transmitted in the system.

Further, in conjunction with the initialization of the terminal device, the cell data for the location area of the terminal device are compared with the inhibition cell register in the terminal device and, if the location area cell data correspond to the cell data in the inhibition cell register, initialization of the terminal device is terminated. A corresponding comparison is performed in conjunction with a channel change initialized by the terminal device and, if the cell data for the target cell correspond to the cell data in the inhibition cell register, no channel change is attempted.

The mobility area of a terminal device is preferably defined in conjunction with the initialization of the wireless local loop. It is also possible to define the terminal device mobility area when the terminal device is entered as a subscriber to the access node of the wireless local loop or when the service package for the terminal device is changed.

As compared with prior art, the present invention has the advantage that it makes it possible to define terminal device specific mobility areas in a wireless local loop environment. A further advantage of the present invention is that it provides means to avoid the transmission of unnecessary initialization messages by making use of a previously stored and continuously updated inhibition cell register. Another advantage of the present invention is that the operator can effectively control the use of the network and distribute network capacity by means of mobility areas.

BRIEF DESCRIPTION OF THE DRAWINGS

In the following, the invention is described by the aid of embodiment examples by referring to the attached drawing, in which.

DETAILED DESCRIPTION OF THE INVENTION

Figure 1:
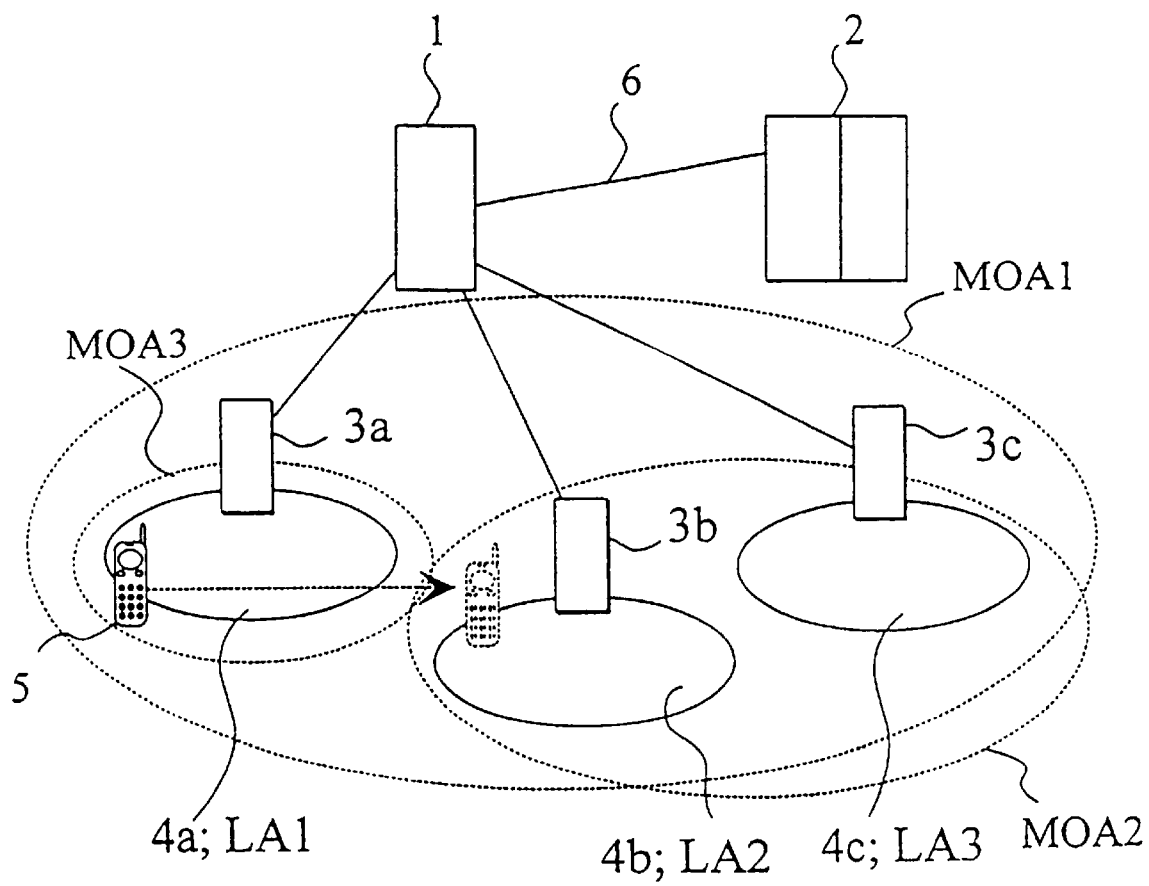
FIG. 1 is diagrammatic representation of a preferred wireless local loop environment according to the present invention.

The wireless local loop system presented in FIG. 1 comprises an access node 1. The access node 1 functions as a concentrating element between a telephone exchange 2 and a terminal device 5, connecting the subscriber to the telephone exchange 2. The access node 1 is connected via a V5.2 interface 6, which comprises 1–16 PCM cables (2 Mbit/s), to the exchange terminal (ET) of the telephone exchange 2, the terminal exchange being provided with the functions required by the V5 interface. Moreover, the system illustrated by FIG. 1 comprises a number of base stations 3a, 3b and 3c, with a cell 4a, 4b and 4c corresponding to each base station, respectively. According to the invention, one cell is defined as a location area (LA). The location area is an area within which the terminal device may move freely without location updating. The terminal device 5 communicates with the base station 3a and further with the access node 1 via a radio link. This radio link can be maintained from location area LA1, i.e. from the area of cell 4a. If the mobile terminal device 5 enters a new location area LA2 or the area of cell 4b, a channel change procedure has to be performed, whereupon the link between the terminal device and the access node 1 is maintained via base station 3b.

FIG. 1 also presents an example of mobility areas MOA1, MOA2 and MOA3 (delimited with broken lines). In this example, mobility area MOA3 comprises only one location area LA1 or cell 4a. Mobility area MOA2 comprises two location areas LA2, LA3 or cells 4b and 4c. Further, mobility area MOAL comprises three location areas LA1, LA2 and LA3 or cells 4a, 4b and 4c. It should be noted that this is only an example of mobility area division and that different location area combinations can be used to form different mobility areas from the three location areas LA1, LA2, LA3 presented in the drawing. In the access node 1, mobility area control is effected using MML (Man Machine Language) commands. Data relating to the mobility areas of terminal devices are preferably stored in the access node 1.

Figure 2A:
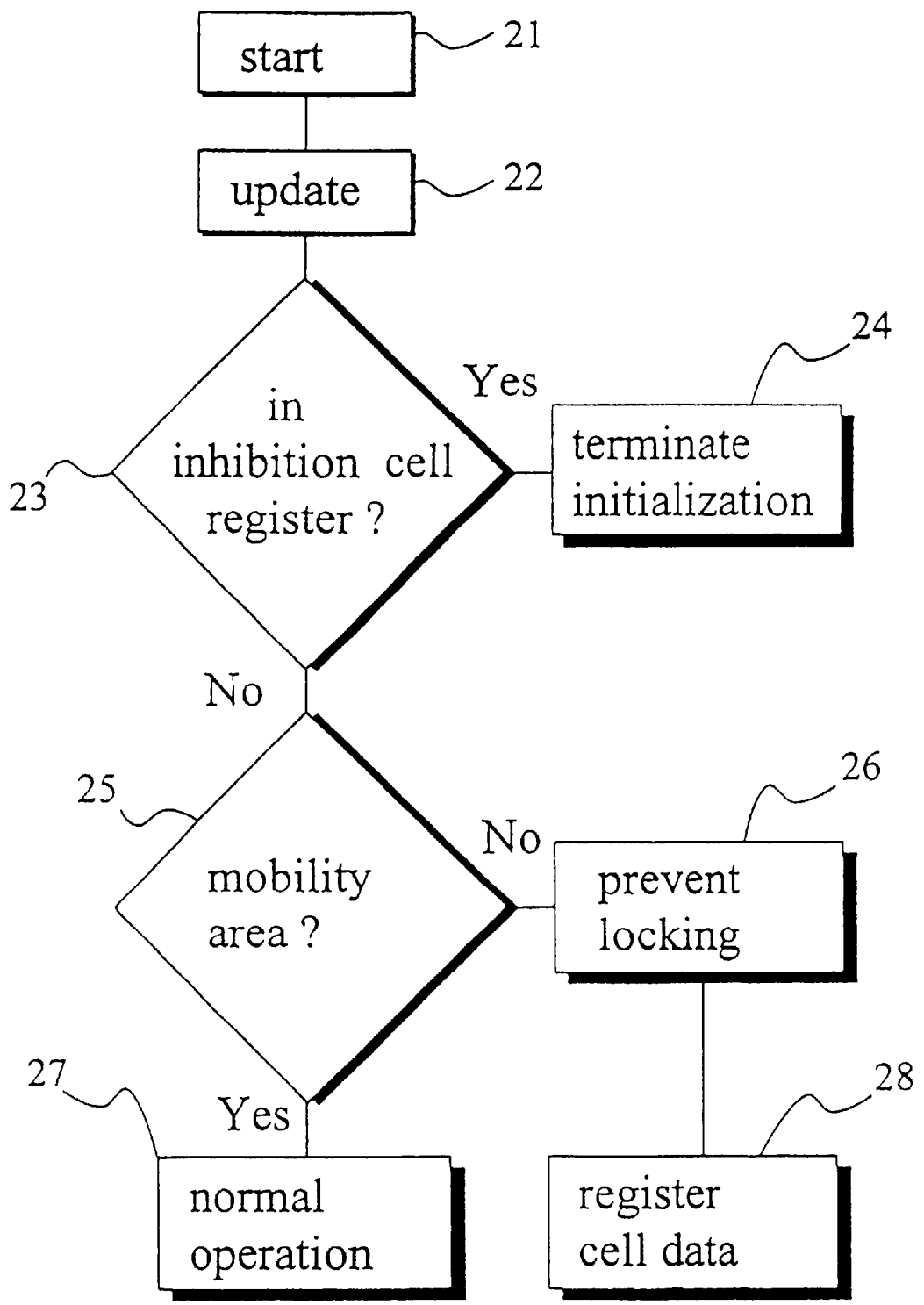
FIGS. 2a–2b present flow diagrams representing a preferred embodiment of the present invention.
Figure 2B:
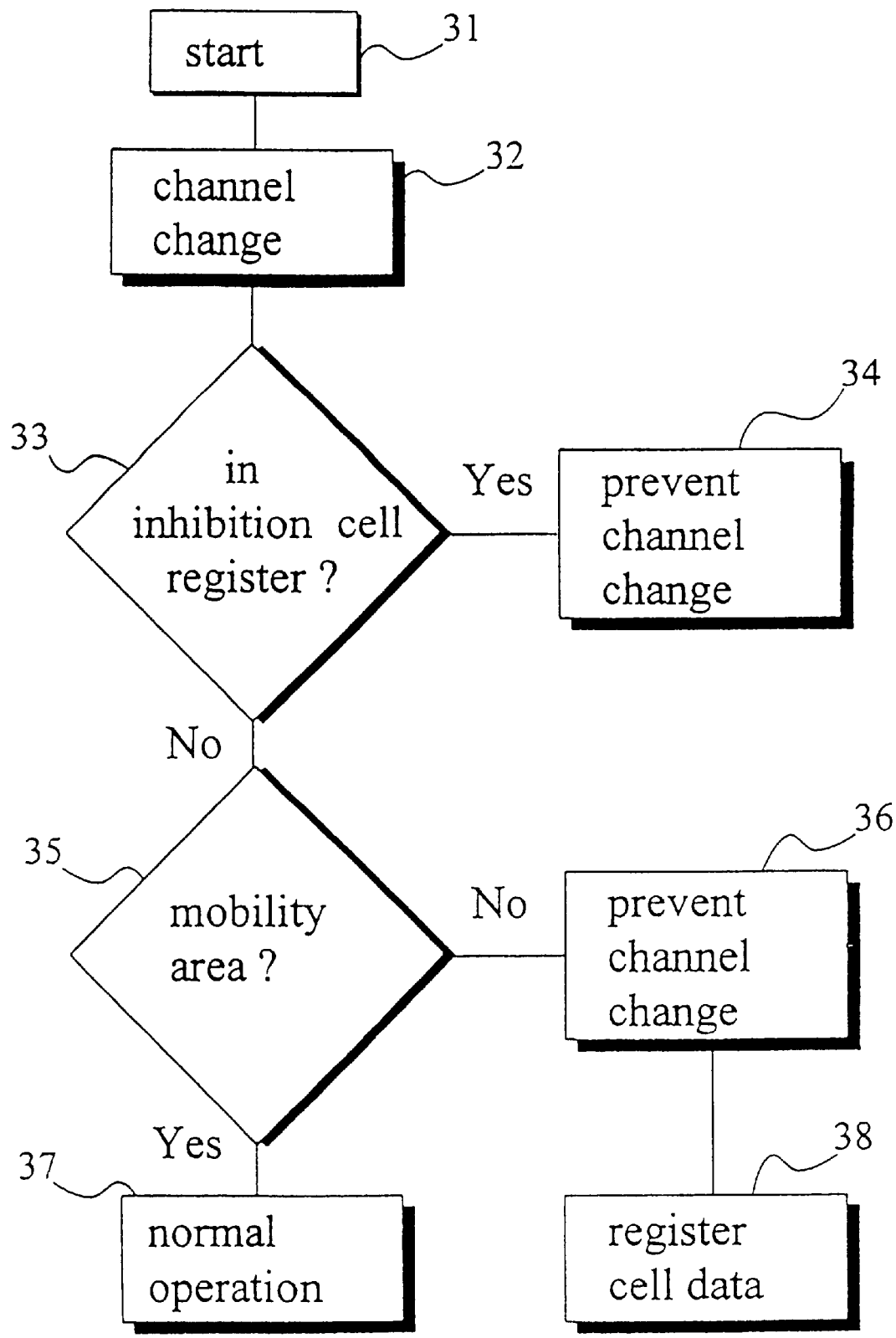

Referring to FIGS. 1, 2a and 2b, two preferred embodiments of the procedure of the present invention will now be described. FIG. 2a presents a block diagram representing a preferred example of the procedure executed during the initialization of a terminal device 5. First, the terminal device 5, which is located in location area LA1, is switched on, block 21, and the location update procedure is started, block 22. Since location area LA1 comprises only one cell 4a, the cell from which the terminal device is trying to get locked with the network is known. Preferably the terminal device 5 only sends the location area data during the update procedure. In logic block 23, the cell data for location area LA1 are compared with the inhibition cell data stored in the terminal device, and if the cell data for location area 4a have been stored in the terminal device, control is passed to block 24 and the initialization procedure is terminated. Thus, the terminal device has previously attempted to get locked with the system from location area LA1 or tried to change to the channel of area LA1. If the inhibition cell register does not contain the cell data for location area LA1, control is passed to logic block 25, where the cell data for location area LA1 are compared with the cell data for the mobility area of the terminal device 5, which are stored in the access node 1. If the mobility area defined for the terminal device 5 is MOA3 or MOA1, in which case the cell data have been stored in the access node, then control is passed to block 27 and the procedure is continued in the normal manner. On the other hand, if the mobility area defined for the terminal device 5 is MOA2, in which case the cell data have not been stored in the access node, then control is passed to block 26 and the locking of the terminal device with the system is inhibited. Further, in block 28 the cell data for location area LA1 are stored in the memory of the terminal device or on the SIM (Subscriber Identity Module) card of the terminal device for later use.

FIG. 2b presents a corresponding example of a preferred channel change procedure according to the invention. In this example, the terminal device is moving from location area LA1 to a new location area LA2, which comprises the coverage area of base station 3b in cell 4b, and the terminal device must execute the channel change procedure. The action for channel change starts from block 31 and proceeds to block 32, where the cell data for the target cell 4b are received. In logic block 33, the cell data for the target cell 4b are compared with the inhibition cell data stored in the terminal device 5 and, if the cell data for the target cell have been stored in the terminal device, control is passed to block 34 and initialization is terminated. In this case, the terminal device 5 has previously attempted to get locked with the system from location area LA2 or to change to the channel of area LA2. If the inhibition cell register contains no cell data for the target cell 4b, then control is passed to logic block 35, where the cell data for the target cell 4b are compared with the cell data for the mobility area of the terminal device 5, stored in the access node 1. If the mobility area defined for the terminal device 5 is MOA2 or MOA1, then the procedure is continued from block 37 in the normal manner. On the other hand, if the mobility area defined for the terminal device 5 is MOA3, then control is passed to block 36 and locking of the terminal device with the system is inhibited. In block 38, the cell data for the target cell 4b are stored in the memory of the terminal device.

The above examples are only presented in a wireless local loop environment, but as is obvious to the person skilled in the art, the invention can be applied to several different wireless data communication systems employing a cellular network.

The invention is not restricted to the examples of its embodiments described above, but many variations are possible within the framework of the inventive idea defined by the claims.

What is claimed is:

1. Procedure for limiting the mobility area (MOA) of a terminal device in a wireless local loop environment comprising an access node (1) connected to a telephone exchange (2) and a base station (3; 3a, 3b, 3c) with a coverage area comprising one or more cells (4; 4a, 4b, 4c), said base station serving to transmit call signals between the access node and the terminal device (5), the procedure comprising defining in the access node (1) the mobility area for the terminal device (5) as a specified geographic area comprising the coverage area of at least one cell (4); and that locking the terminal device with the local loop is inhibited by the access node (1) if the cell from which the terminal device is trying to get locked is outside the mobility area.

2. Procedure as defined in claim 1, wherein a specified geographic area is defined as a location area (LA), which corresponds to the coverage area of one cell (4), and the location area is assigned an individual identification code.

3. Procedure as defined in claim 1, wherein the mobility area (MOA) comprises one or more location areas (LA).

4. Procedure as defined in claim wherein data identifying the location areas (LA) comprised in the mobility area (MOA) of the terminal device (5) are stored in a register corresponding to the terminal device.

5. Procedure as defined in claim 4, wherein in conjunction with initialization of the terminal device, cell data for the location area (LA) of the terminal device (5) are compared with cell data stored in the register corresponding to the terminal device and, if the cell data for the location area are inconsistent with the cell data in the register corresponding to the terminal device, the initialization of the terminal device is terminated and the cell data for the location area are stored in an inhibition cell register provided in the terminal device.

6. Procedure as defined in claim 5, wherein in conjunction with the initialization of the terminal device (5), the cell data for the location area (LA) of the terminal device are compared with the inhibition cell register in the terminal device and, if the location area cell data correspond to the cell data in the inhibition cell register, the initialization of the terminal device is terminated.

7. Procedure as defined in claim 1, wherein the mobility area of the terminal device (5) is defined in conjunction with the initialization of the wireless local loop.

8. Procedure as defined in claim 1, wherein the mobility area of the terminal device is defined when the terminal device is being entered as a subscriber to the access node (1) of the wireless local loop.

9. Procedure as defined in claim 1, wherein the connection between the access node (1) and the telephone exchange (2), which is an access node V5 interface consistent with the V5 standard, is implemented using signalling consistent with the V5 standard.

10. Procedure as defined in claim 1 further comprising inhibiting by the access node a channel change by the terminal device if the cell to whose channel it is trying to change is outside the mobility area.

11. Procedure as defined in claim 10, wherein data identifying the location areas (LA) comprised in the mobility area (MOA) of the terminal device (5) are stored in a register corresponding to the terminal device.

12. Procedure as defined in claim 11, wherein in conjunction with a channel change being initialized by the terminal device (5), cell data for the target cell to which a channel change is being attempted are compared with cell data in the register corresponding to the terminal device and, if the cell data for the target cell are inconsistent with the cell data in the register corresponding to the terminal device, the channel change to the target cell being initialized by the terminal device is inhibited and the cell data for the target cell are stored in an inhibition cell register provided in the terminal device.

13. Procedure as defined in claim 12, wherein in conjunction with a channel change being performed by the terminal device, the cell data for the target cell are compared with the inhibition cell register in the terminal device and, if the cell data for the target cell correspond to the cell data in the inhibition cell register, the channel change process is terminated.

* * * * *